Figure 1:
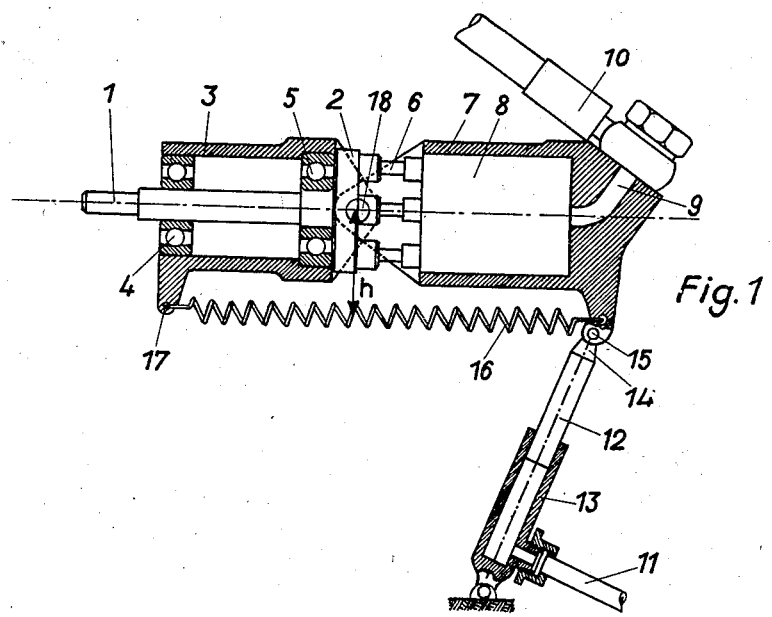

July 18, 1944.  H. MOLLY  2,353,745
ADJUSTABLE STROKE PUMP
Filed Aug. 10, 1940  2 Sheets-Sheet 1

Inventor:
Hans Molly
By A. D. Adams
Attorney

Inventor:
Hans Molly
By A.D. Adams
Attorney

Patented July 18, 1944

2,353,745

UNITED STATES PATENT OFFICE 2,353,745

ADJUSTABLE STROKE PUMP

Hans Molly, Berlin-Tempelhof, Germany; vested in the Alien Property Custodian

Application August 10, 1940, Serial No. 352,147
In Germany August 11, 1939

5 Claims. (Cl. 103—162)

The invention relates to pumps with adjustable stroke in which according to a known arrangement a stroke adjusting pressure control device is provided acting on the stroke adjusting member in opposition to a spring determining the desired pressure. As is known, pumps of this type operate in such manner that a spring acts on the stroke adjusting member so as to urge it toward its maximum stroke position. This spring is counteracted by a pressure responsive regulating member tending to return the stroke adjusting member to its zero position. Thus, the spring force and the adjusting force balance one another at a certain pressure determined by the spring force. If the pressure decreases on account of increased pressure fluid consumption, the spring force will predominate and shift the stroke adjusting member until the pump, due to the increased amount of pressure fluid, is again capable of maintaining a pressure equal to the force of the spring. The object of the present invention consists in obtaining a desired characteristic of the predetermined pressure course in dependence on the adjustment of the stroke adjusting member. It may for instance be desirable for certain purposes to maintain the predetermined pressure constant independent of the position of the stroke adjusting member. As however the tension of the spring decreases at increasing spring displacement and increasing displacement of the stroke adjusting member, respectively, this object may not be attained simply by means of a spring per se. The inventive principle therefore consists in the feature that the points of suspension of the spring are so chosen as to vary the effective lever arm of the spring in response to the varying displacement of the stroke adjusting member in such manner that the predetermined pressure course may be chosen according to a curve which is independent of the spring characteristic. If the suspension points of the spring are for instance chosen in such manner that the effective lever arm of the spring increases in proportion to the increasing displacement of the stroke adjusting member and the increasing displacement of the spring, respectively, a constant rocking moment is obtained at all deflection angles of the stroke adjusting member and hence regulation to a constant pressure value may be effected. The points of application of the spring force may, however, also be chosen in such a way that the effective lever arm of the spring decreases at increasing deflecting angles. In such an arrangement the pump is rendered capable of automatically maintaining a high pressure even at small pressure fluid amounts and a smaller pressure decrease according to a predetermined characteristic with small pressure fluid amounts. Such a characteristic is for instance desirable in cases where a pressure fluid motor is fed from the pump, said motor being required to produce a great force at a small number of revolutions and a lower force at a great number of revolutions.

An essentially different characteristic of the pressure development is obtained if in a further modification of the embodiment of the invention the points of application of the spring force are so chosen that the effective lever arm of the spring, and hence the rocking moment, increases in proportion to the deflecting angle of the stroke adjusting member. In such cases the pump normally operates with maximum stroke volumes. As soon, however, as the pressure in the pressure conduit exceeds the maximum rocking moment, the stroke adjusting member due to this increased pressure suddenly returns to the zero position and the pump maintains, at a minimum pressure fluid amount, a lower pressure corresponding to the reduced rocking moment. Now as soon as this pressure drops still further the rocking moment will predominate, immediately returning the stroke adjusting member to its maximum stroke position until the steps described repeats itself. Such a pump characteristic is for instance required for retracting gears for undercarriages, in which the undercarriage in the first instance has to be retracted at a high pressure and subsequently after adjustment has to be maintained in the retracted position at a lower pressure. In all arrangements, in which the effective lever arm of the spring increases with increasing deflection angles, it is advantageous with respect to space to produce the rocking moment by means of a compression spring.

Figure 1A:
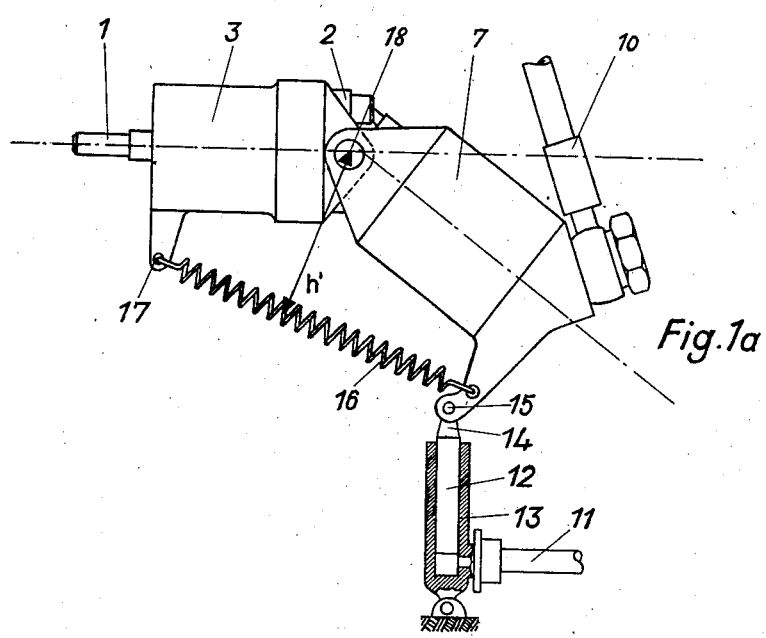
Figure 2:
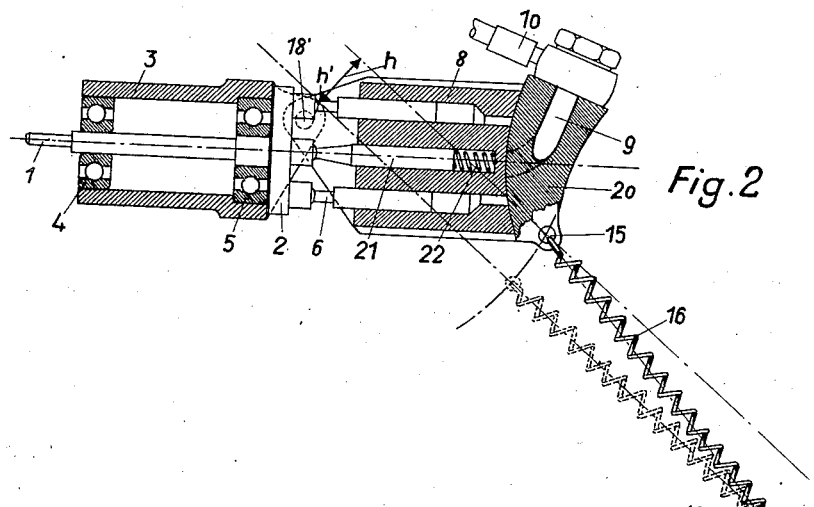
Figure 3:
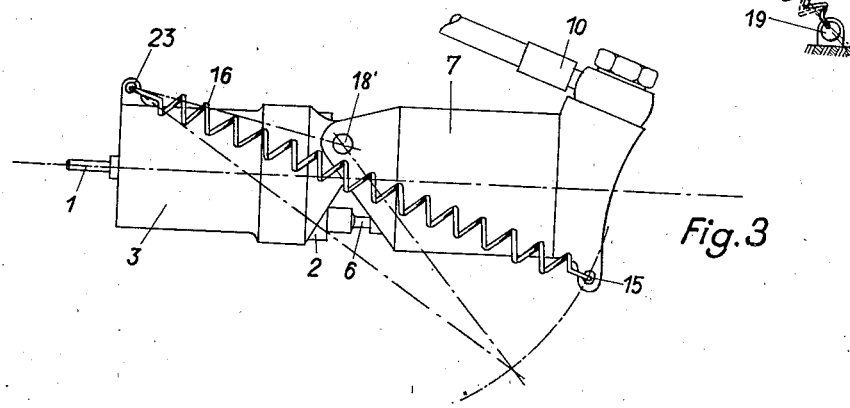
Figure 4:
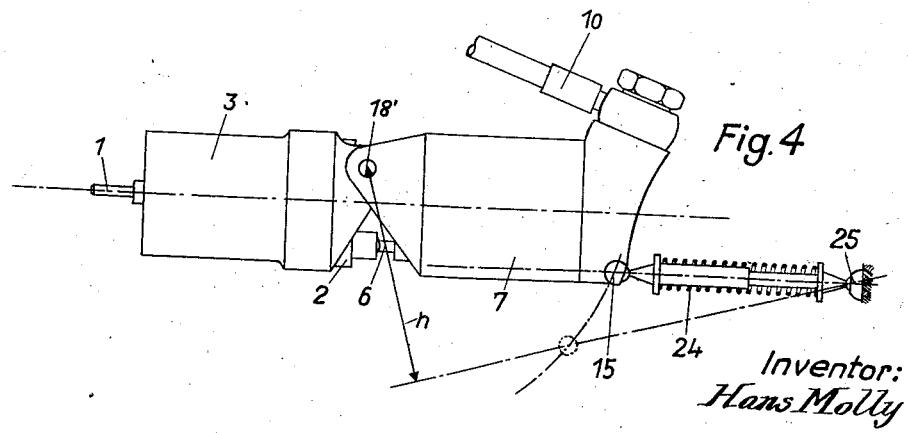

In the following the invention is explained in detail with reference to the embodiments shown in the drawings, in which Fig. 1 is a longitudinal sectional view showing an embodiment of a spring suspension in which a constant rocking moment is attainable at all deflection angles of the stroke adjusting member, Fig. 1a is a side elevation showing the same arrangement in the zero pressure position at a deflected position of the stroke adjusting member, Fig. 2 is a longitudinal sectional view of a modified spring suspension in which the effective lever arm of the spring is reduced at increasing deflection angles of the stroke adjusting member, Fig. 3 is a side elevation of a further embodiment, in which the effective lever arm of the spring increases as the deflection angle increases, and Fig. 4 is a side elevation of the embodiment of Fig. 3 in which the tension spring is replaced by a correspondingly connected compression spring. In all figures the same reference characters indicate identical parts.

In the Figs. 1 and 1a the numeral 1 denotes a driving shaft for a driving flange 2 supported in a casing 3 by means of ball bearings 4 and 5. Piston rods 6 are articulately connected to the driving flange 2; the respective pistons, provided that the axis of the driving flange 2 inclines relative to the cylinder block 8, reciprocate in said cylinder block 8 which latter is arranged in a carrier 7. The follow-up movement of the cylinder block 8 is advantageously effected in a manner already known, namely by means of piston rods 6 articulately connected to the driving flange 2. By means of the piston stroke a certain amount of pressure fluid is pumped from a pressure fluid container (not shown) into a conduit 10 through a bore 9 in a control surface of the cylinder block 8, the amount being dependent on the angle of deflection of the cylinder block carrier relative to the driving flange, and said conduit leading to a consumption apparatus, for instance a pressure fluid motor (not shown). The pressure in the conduit 10 further acts by means of a conduit 11 on a piston 12 arranged in a cylinder 13. The free end 14 of the piston 12 is arranged as a piston rod and is articulately connected at 15 to the carrier 7 of the cylinder block 8. A spring 16 is secured at the same point, the other end being fixed on the casing 3 at the point 17. The tension of the spring 16 tends to deflect the cylinder block 8 together with its carrier 7 about the pivot point 18 and is counteracted by a counterpressure acting on the piston 12.

Assuming that the cylinder block carrier 7 is deflected by a certain angle for producing a certain predetermined pressure as shown in Figure 1a. This position of the cylinder block carrier corresponds to a certain pressure value in the conduit 10 as well as to a certain rocking moment exerted by the piston 12 by means of the conduit 11 on the cylinder block carrier 7 and a certain countermoment produced by the spring 16, the force of which is applied below the lever arm $h'$. In the position shown these two moments balance one another, i. e., the consumption apparatus is regulated to a certain predetermined pressure. If the pressure increases in the conduit 10, the piston 12 tends to reestablish the predetermined pressure in the conduit 10 by adjusting the cylinder block carrier 7 at a reduced angle corresponding to the increased fluid pressure. For this position a reduced lever arm $h'$ of the spring results but an increased spring tension, and therefore the rocking moment of the spring remains constant so that the stroke adjusting member, upon the reattainment of the predetermined pressure, resumes the illustrated position. Contrary to this the cylinder block carrier at diminishing pressure in the conduit 10, in order to restore the predetermined pressure, tends to assume a more deflected position. In this instance the rocking moment of the spring 16 also remains constant as the lever arm $h'$ increases in length while the spring force decreases. Thus in every position of the cylinder block carrier the spring 16 exerts a constant rocking moment thereon which is a necessary requirement for regulating to a constant pressure.

Fig. 2 shows a mode of spring suspension according to which the rocking moment exerted by the spring increases as the angle of deflection decreases. In the initial position of zero the lever arm $h$ is operative. In the deflected position (dotted spring) the reduced lever arm $h'$ is operative. This is due to the fact that the spring is not—as shown in Figs. 1 and 1a—articulately secured on the casing 3 but at a point 19 outside or beyond the casing. A characteristic feature is obtained in this way which is desirable, as already mentioned, where a pressure fluid motor has to be fed, said motor having to exert a great force at a small number of revolutions and inconsiderable force at a large number of revolutions. The pump illustrated is further distinct from that shown in Figs. 1 and 1a in that the moment counteracting the spring 16 is not produced by a special piston but by means of the pivot point 18' of the stroke adjusting member which is eccentric relative to the axes of the driving flange and of the cylinder block. Furthermore the control surface 20 contrary to that of the above mentioned embodiment is of spherical form while the cylinder block 8 is articulately connected with the driving flange 2 by means of a special centering member 21 supported by means of a spring 22.

An embodiment in which the effective lever arm of the spring and consequently the rocking moment thereof increases at increasing angles of deflection is shown in Fig. 3. Here also the force tending to shift the stroke adjusting member into its zero position is produced by supporting the cylinder block 7 eccentrically at 18'. The spring force 16 is at the one end applied to the cylinder block carrier 7 at 15 and at the other end on the casing 3 at 23.

As mentioned above in describing the mode of operation of this type of pump, this pump is operative in but two positions, namely at the maximal stroke and at a small set predetermined stroke, while it is inoperative in any other position.

The effect obtained according to Fig. 3 by means of a tension spring 16 may also be obtained, as shown in Fig. 4, by using a compression spring 24, said compression spring acting on one end on the stroke adjusting member at point 15 and on the other end resting against a fixed point 25. The operation of such a compression spring will be apparent from the foregoing description. The use of such a compression spring offers advantages in so far as it can be easily mounted in the pump casing. As moreover the compression spring can act concentrically on the cylinder block carrier, one drawback connected with the use of tension springs is eliminated, namely that two springs must be provided in order to avoid one-sided application and said springs having to be arranged alongside the cylinder block (cfr. Fig. 3).

As already mentioned, the figures merely represent embodiments of the invention. It is of course possible to use the spherical control surface according to Figs. 2–4 in the embodiments according to Figs. 1 and 1a. Furthermore the countermoment according to Figs. 1 and 1a produced by a special piston may be obtained by an eccentric support of the stroke adjusting member as shown in Figs. 2–4.

What is claimed is:

1. An automatically regulated hydraulic pump of the piston type, comprising a cylinder block formed with a plurality of cylinder bores, means for supporting said block for rotation about its axis, pistons in said cylinder bores, a driving flange mounted for rotation about its axis, a bearing providing support for the driving flange, piston rods for operatively connecting said pistons with said driving flange, said cylinder block and said driving flange being arranged so as to allow variation of the stroke of the pump in response to the inclinations of one part relative to the other, and means tending to decrease the stroke of the pump in response to an increase in the pressure thereof, the action of said means being counteracted by a spring tending to increase the stroke of the pump said spring being so disposed that its effective lever arm varies relative to its tension variation, to determine the rocking moment exerted by the spring.

2. An automatically regulated hydraulic pump of the piston type, comprising a cylinder block formed with a plurality of cylinder bores, means for supporting said block for rotation about its axis, pistons in said cylinder bores, a driving flange mounted for rotation about its axis, a bearing providing support for the driving flange, and piston rods for operatively connecting said pistons with said driving flange, said cylinder block and said driving flange being arranged to allow variation of the stroke of the pump in response to the inclinations of one part relative to the other, the axis of inclination being eccentric with respect to the axis of said cylinder block and said driving flange, respectively, thereby producing a force decreasing the stroke of the pump corresponding to the fluid pressure of same, said force being counteracted by a spring tending to increase the stroke of the pump, said spring being so disposed that its effective lever arm and its tension increase, as the inclination of the block and flange relative to one another decreases, so that the spring exerts an increasing rocking moment.

3. An automatically regulated hydraulic pump of the piston type comprising a cylinder block formed with a plurality of cylinder bores, means for supporting said block for rotation about its axis, pistons in said cylinder bores, a driving flange mounted for rotation about its axis, a bearing providing support for the driving flange, and piston rods for operatively connecting said pistons with said driving flange, said cylinder block and said driving flange being arranged to allow variation of the stroke of the pump in response to the inclination of the one part relative to the other, the axis of inclination being eccentric with respect to the axis of said cylinder block and said driving flange, respectively, thereby producing a force decreasing the stroke of the pump corresponding to the fluid pressure thereof, said force being counteracted by a spring acting between the moving part and a fixed point tending to increase the stroke of the pump, said spring being so disposed that its effective lever arm increases in proportion to the decrease in its tension, to determine the rocking moment exerted by the spring.

4. An automatically regulated hydraulic pump of the piston type comprising a cylinder block formed with a plurality of cylinder bores, means for supporting said block for rotation about its axis, pistons in said cylinder bores, a driving flange mounted for rotation about its axis, a bearing providing support for the driving flange, and piston rods for operatively connecting said pistons with said driving flange, said cylinder block and said driving flange being arranged to allow variation of the stroke of the pump in response to the inclination of the one part relative to the other, the axis of inclination being eccentric with respect to the axis of said cylinder block and said driving flange, respectively, thereby producing a force decreasing the stroke of the pump corresponding to the fluid pressure thereof, said force being counteracted by a spring acting between the moving part and a fixed point tending to increase the stroke of the pump, said spring being so disposed that its effective lever arm increases and its tension decreases, as the inclination of the block and flange relative to one another increases, so that the spring exerts an increasing rocking moment.

5. An automatically regulated hydraulic pump as claimed in claim 3, the increase of the effective lever arm of the spring exceeding the decrease of the tension of the spring, thereby maintaining the fluid pressure of the pump at two different values.

HANS MOLLY.